(12) United States Patent
Yanagibayashi

(10) Patent No.: US 12,031,961 B2
(45) Date of Patent: Jul. 9, 2024

(54) BINARY PUMP AND LIQUID CHROMATOGRAPH

(71) Applicant: SHIMADZU CORPORATION, Kyoto (JP)

(72) Inventor: Jun Yanagibayashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 490 days.

(21) Appl. No.: 17/615,561

(22) PCT Filed: Jun. 26, 2019

(86) PCT No.: PCT/JP2019/025289
§ 371 (c)(1),
(2) Date: Nov. 30, 2021

(87) PCT Pub. No.: WO2020/261405
PCT Pub. Date: Dec. 30, 2020

(65) Prior Publication Data
US 2022/0252556 A1 Aug. 11, 2022

(51) Int. Cl.
*G01N 30/32* (2006.01)
*F04B 41/06* (2006.01)
(Continued)

(52) U.S. Cl.
CPC .............. *G01N 30/32* (2013.01); *F04B 41/06* (2013.01); *F04B 49/06* (2013.01); *G01N 2030/027* (2013.01); *G01N 2030/326* (2013.01)

(58) Field of Classification Search
CPC ............. G01N 30/32; G01N 2030/027; G01N 2030/326; F04B 41/06; F04B 49/06
See application file for complete search history.

(56) References Cited

U.S. PATENT DOCUMENTS

| 5,637,208 A | 6/1997 | Dourdeville |
| 5,664,937 A | 9/1997 | Takahashi |

(Continued)

FOREIGN PATENT DOCUMENTS

| JP | 2001254684 A | * | 9/2001 |
| JP | 2005-55179 A | | 3/2005 |
| WO | 2018/055866 A1 | | 3/2018 |

OTHER PUBLICATIONS

Translation of JP-2001254684-A (Year: 2001).*
(Continued)

*Primary Examiner* — Nathaniel T Woodward
(74) *Attorney, Agent, or Firm* — Renner, Otto, Boisselle & Sklar, LLP

(57) ABSTRACT

A binary pump in which an operation controller causes each of two liquid delivery pumps to execute, while a secondary discharge process is executed, a suction process, a first pre-pressurizing process, and a standby process. The operation controller causes each of the two liquid delivery pumps to execute a second pre-pressurizing process before proceeding from the secondary discharge process to the primary discharge process. Furthermore, the operation controller causes, as long as continuous liquid delivery by each of the two liquid delivery pumps is not interrupted, at least one of the two liquid delivery pumps to execute avoidance operation of interrupting the standby process and proceeding to the second pre-pressurizing process by using the operation state of each of the two liquid delivery pumps, so as to avoid overlap of execution time zones of the primary discharge processes of the two liquid delivery pumps.

11 Claims, 9 Drawing Sheets

(51) Int. Cl.
*F04B 49/06* (2006.01)
*G01N 30/02* (2006.01)

(56) References Cited

U.S. PATENT DOCUMENTS

| | | |
|---|---|---|
| 2005/0023205 A1 | 2/2005 | Hiraku |
| 2006/0174697 A1 | 8/2006 | Bierbaum |
| 2008/0206067 A1 | 8/2008 | De Corral |
| 2008/0296209 A1* | 12/2008 | Takao .................. G01N 30/32 |
| | | 210/96.1 |
| 2010/0275678 A1 | 11/2010 | Herzog |
| 2010/0288027 A1* | 11/2010 | Ishii ..................... G01N 30/32 |
| | | 73/61.56 |
| 2011/0132463 A1 | 6/2011 | Witt |
| 2012/0216886 A1 | 8/2012 | Herzog |
| 2013/0104631 A1 | 5/2013 | Tokuo |
| 2015/0219091 A1 | 8/2015 | Jackson |
| 2015/0219603 A1 | 8/2015 | Jackson |
| 2019/0211813 A1 | 7/2019 | Yanagibayashi |

OTHER PUBLICATIONS

International Search Report for corresponding Application No. PCT/JP2019/025289, mailed Oct. 1, 2019.
Written Opinion for corresponding Application No. PCT/JP2019/025289, mailed Oct. 1, 2019 (English machine translation).

* cited by examiner

FIG. 3
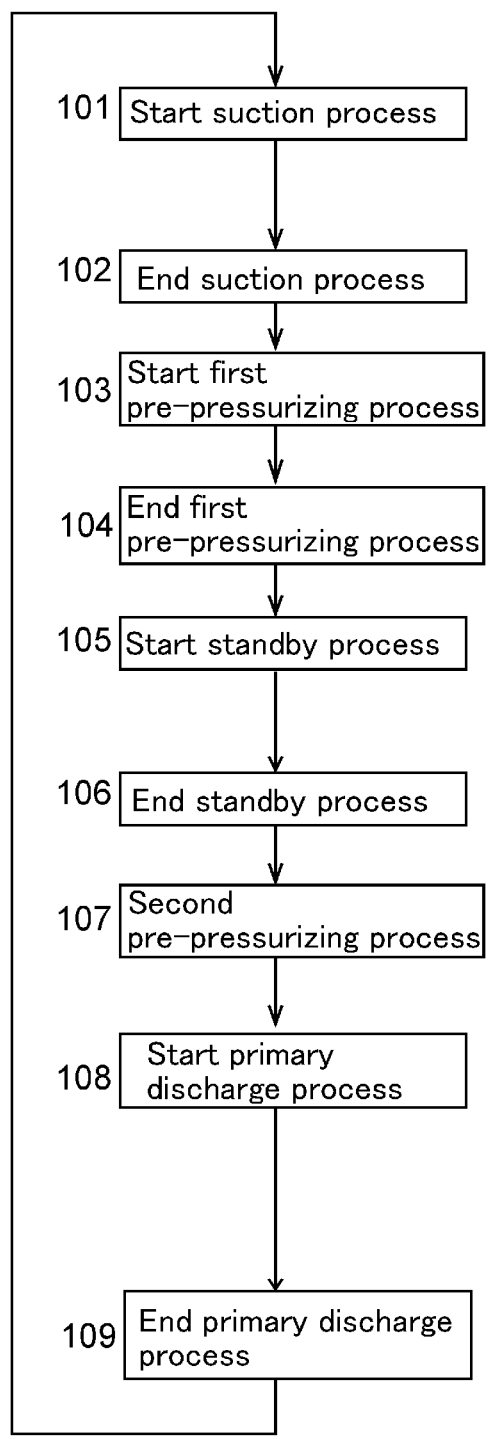
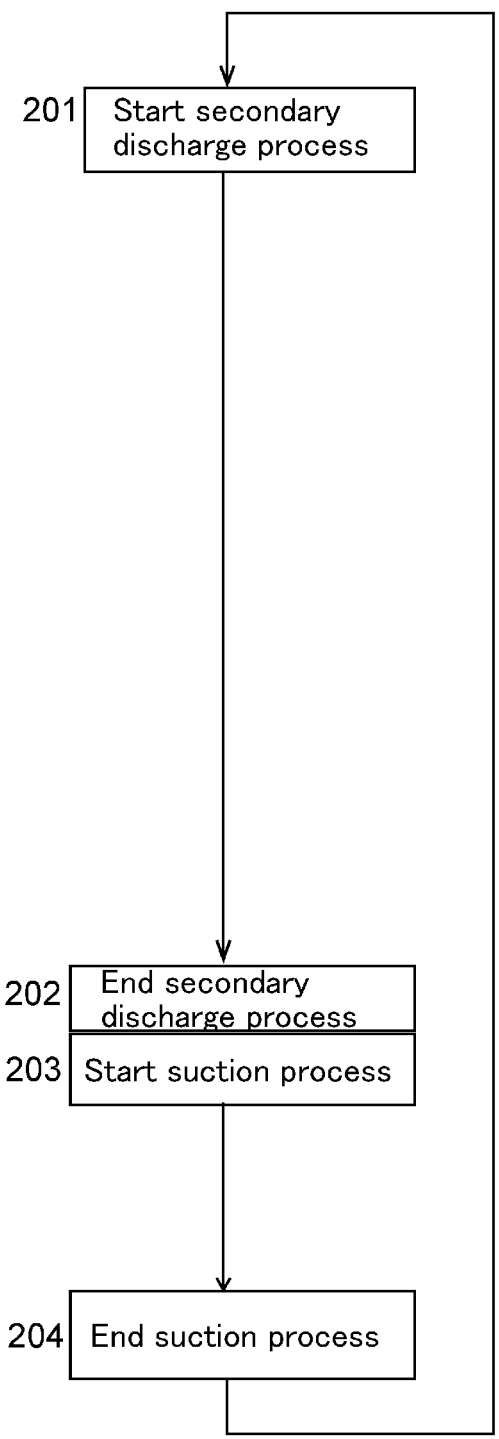

FIG. 6
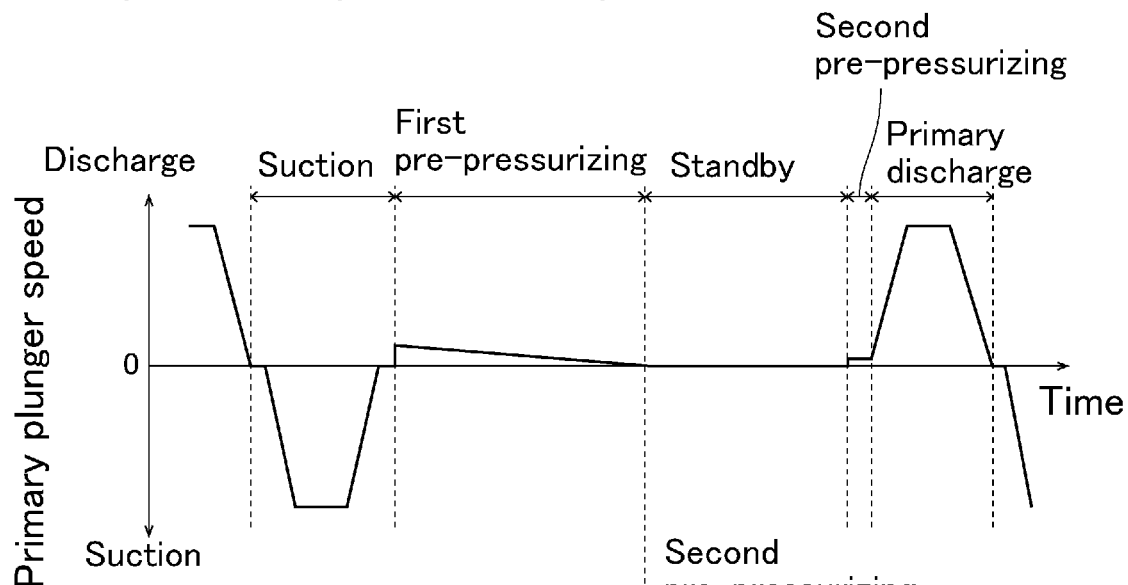
Liquid delivery pump 2A
(liquid delivery flow rate ≦ predetermined flow rate)
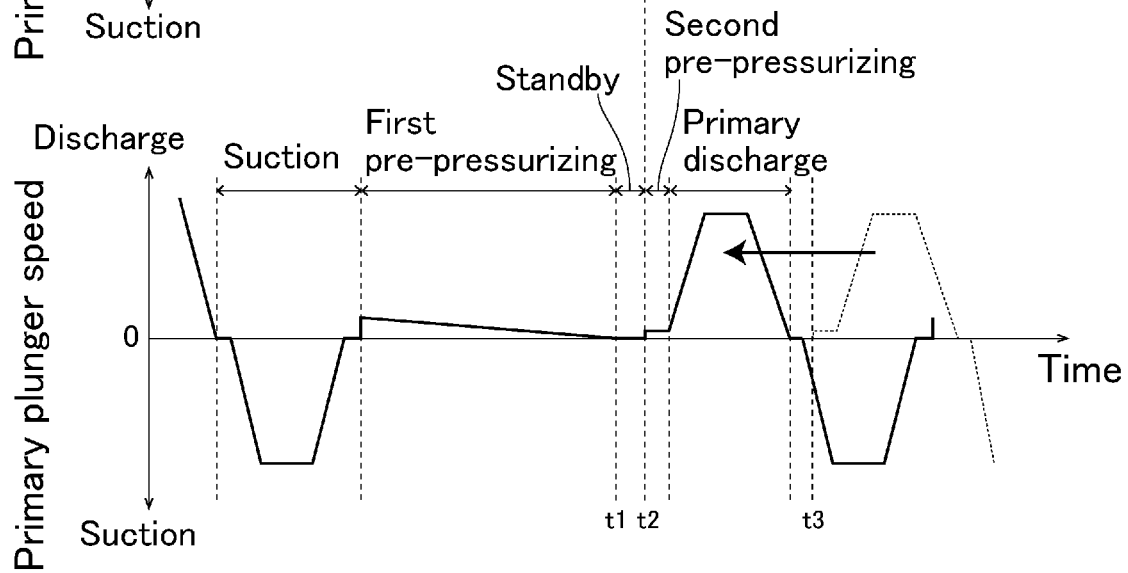
Liquid delivery pump 2B
(liquid delivery flow rate ≦ predetermined flow rate)

FIG. 7
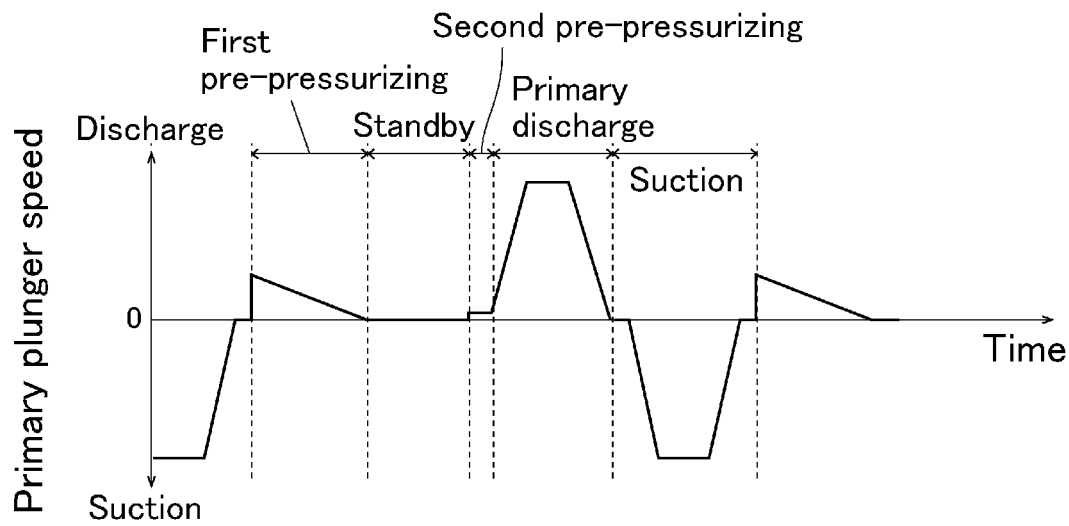
Liquid delivery pump 2A
(liquid delivery flow rate > predetermined flow rate)
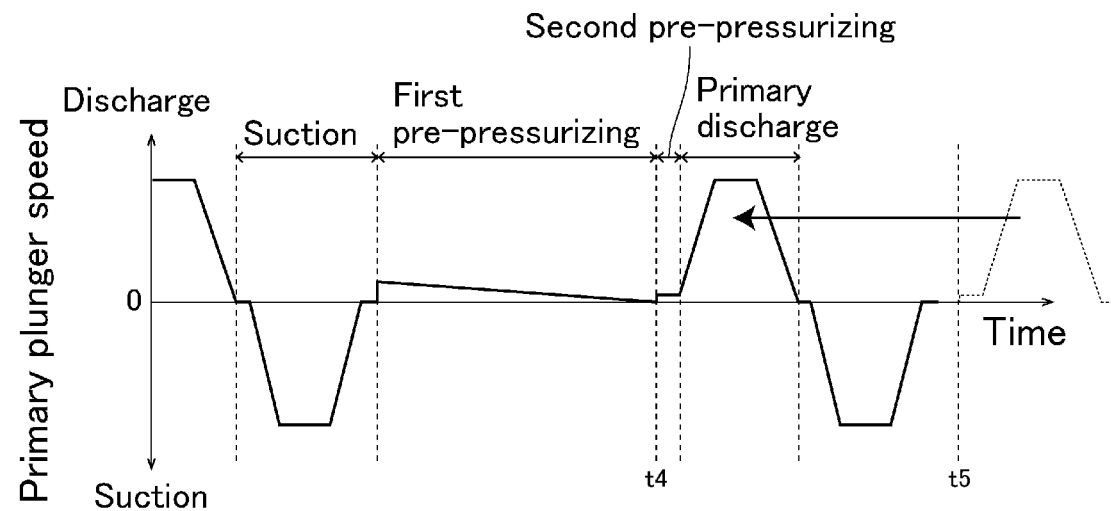
Liquid delivery pump 2B
(liquid delivery flow rate ≦ predetermined flow rate)

FIG. 8
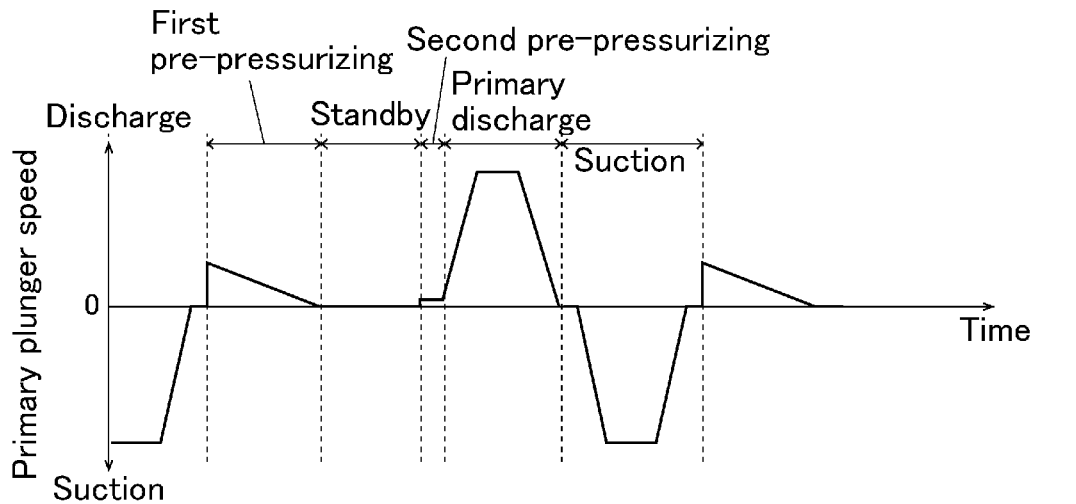
Liquid delivery pump 2A
(liquid delivery flow rate > predetermined flow rate)
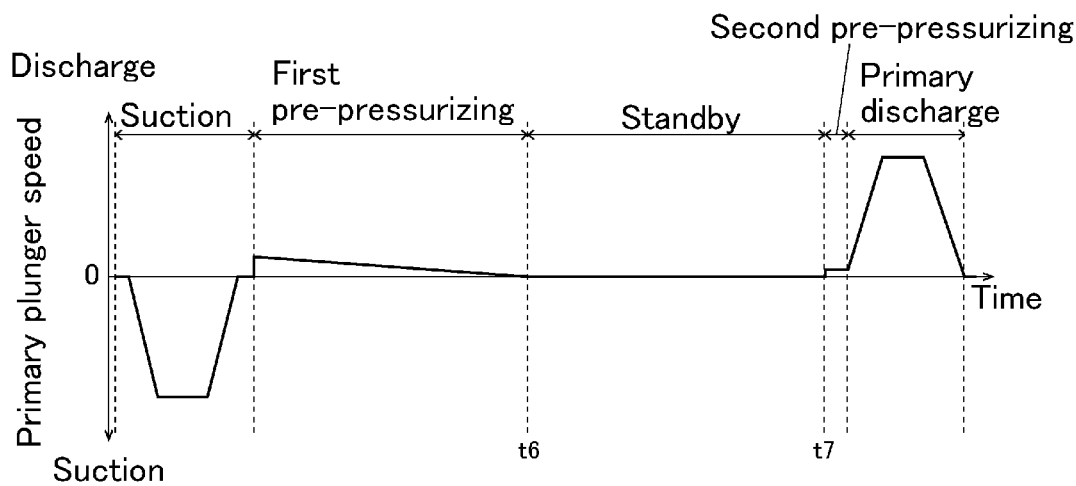
Liquid delivery pump 2B
(liquid delivery flow rate ≦ predetermined flow rate)

FIG. 9
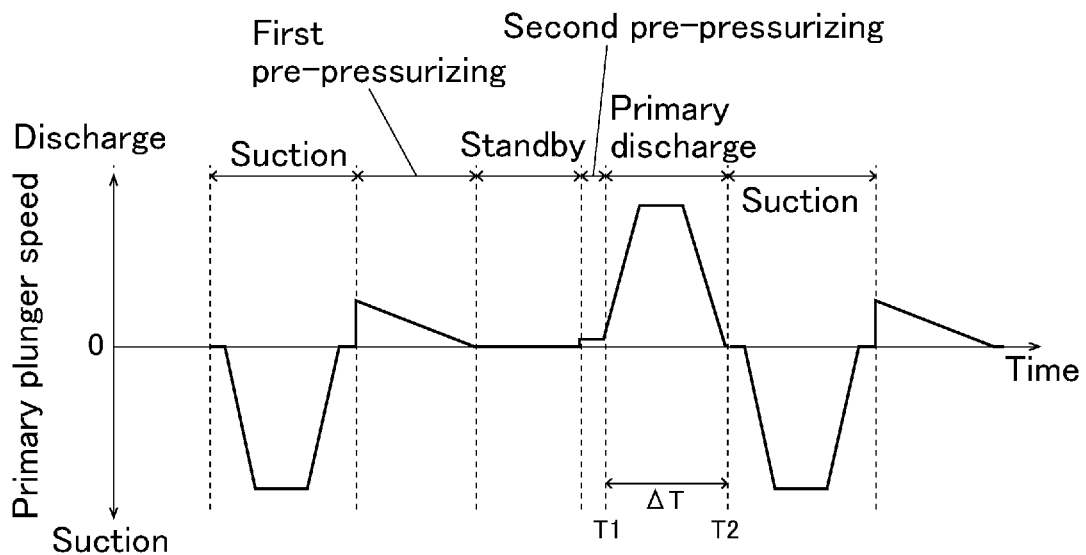
Liquid delivery pump 2A
(liquid delivery flow rate > predetermined flow rate)
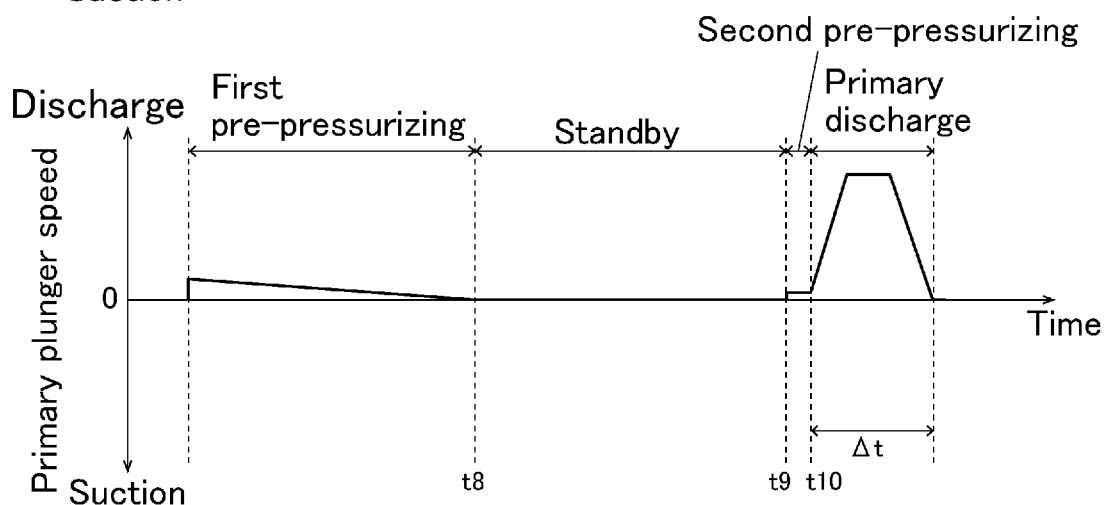
Liquid delivery pump 2B
(liquid delivery flow rate ≦ predetermined flow rate)

FIG. 10
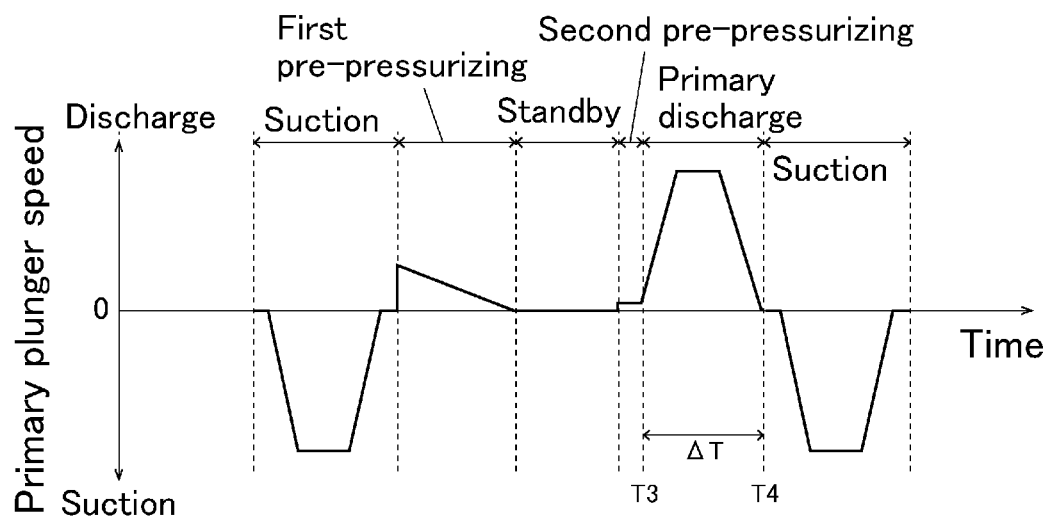
Liquid delivery pump 2A
(liquid delivery flow rate > predetermined flow rate)
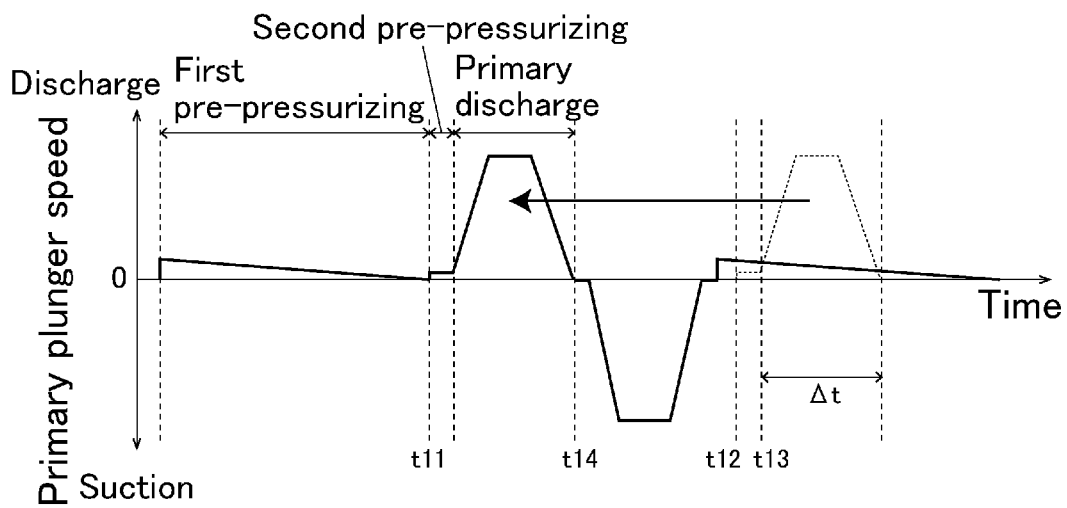
Liquid delivery pump 2B
(liquid delivery flow rate ≦ predetermined flow rate)

BINARY PUMP AND LIQUID CHROMATOGRAPH

TECHNICAL FIELD

The present invention relates to a binary pump used in an analysis device such as a high performance liquid chromatograph and a liquid chromatograph including the binary pump.

BACKGROUND ART

In a liquid chromatograph, a mobile phase such as water or an organic solvent is pumped at a high pressure in an analysis channel by a liquid delivery pump. A sample to be analyzed is introduced into a mobile phase by a sample injector, mixed, and transferred to a separation column. In the separation column, each component substance in the sample is retained for different periods of time depending on the affinity with the mobile phase and the separation column, and then eluted from the separation column. Component substances sequentially eluted from the separation column are detected by a detector. The mobile phase and each component substance that have passed through the detector are discharged to the drain. A signal obtained by the detector is transferred to a data processing device, and qualitative processing and quantitative processing of each component substance are performed.

As a method of delivering a mobile phase in an analysis device such as a liquid chromatograph, there are methods such as an isocratic method, a low-pressure gradient method, and a high-pressure gradient method. The isocratic method is a method in which one type of mobile phase is delivered by one liquid delivery pump. The low-pressure gradient method is a method that realizes a desired mobile phase composition by sequentially delivering a plurality of types (usually, four types at the maximum) of mobile phases using a proportional solenoid valve and one liquid delivery pump. The high-pressure gradient method is a method of realizing a desired mobile phase composition by causing one liquid delivery pump to correspond to each of a plurality of types (usually, two types at the maximum) of mobile phases and merging the mobile phases at an outlet of each liquid delivery pump (and before a sample injector). In particular, a liquid delivery device capable of realizing liquid delivery in the high-pressure gradient method by two types of mobile phases as one device is called a binary pump.

In a liquid chromatograph, controlling a mobile phase to have a desired composition is an essential requirement for ensuring reliability of an analysis result. In particular, in the high-pressure gradient method, the flow rate stability of the liquid delivery pump directly affects the reproducibility of a mobile phase composition. Further, depending on a type of the detector, pulsation of pressure and the like and a composition of a mobile phase may become noise and be sensed.

For these reasons, a liquid delivery pump of a liquid chromatograph has been required to have high flow rate stability (low pulsation performance). In order to deliver a low flow rate (for example, several mL/min or less) used in a liquid chromatograph at a high pressure (for example, several tens of MPa), a plunger pump is generally employed as a liquid delivery pump. Then, since liquid delivery is intermittent in a single plunger pump, a liquid delivery pump of a double plunger system in which two plunger pumps are connected in series or in parallel and operated in a complementary manner is often used.

PRIOR ART DOCUMENTS

Patent Documents

Patent Document 1: U.S. Pat. No. 5,637,208 A
Patent Document 2: US 2012/216886 A1
Patent Document 3: US 2010/275678 A1
Patent Document 4: US 2008/206067 A1
Patent Document 5: U.S. Pat. No. 5,664,937 A
Patent Document 6: US 2011/132463 A1
Patent Document 7: US 2015/219091 A1
Patent Document 8: US 2015/219603 A1
Patent Document 9: US 2013/104631 A1

SUMMARY OF THE INVENTION

Problems to be Solved by the Invention

In a liquid delivery pump of the double plunger system, at least one plunger pump performs a pre-pressurizing process for increasing a pressure in a pump chamber to a system pressure or a pressure in the vicinity of the system pressure after a liquid suction process is completed. If the pre-pressurizing in the pump chamber is insufficient in this pre-pressurizing process, a liquid delivery flow rate is lost in a subsequent discharge process. Conversely, if the pre-pressurizing is excessive, the liquid delivery flow rate is also excessive. In either case, the liquid delivery stability is impaired. In order to solve such a problem, a technique of accurately controlling the operation of the plunger in the pre-pressurizing process by measuring a pressure in the pump chamber during the pre-pressurizing process and comparing the measured value with a measured value of the system pressure is disclosed (see Patent Document 1).

As a secondary factor of impairing the liquid delivery stability of the liquid delivery pump, a temperature of a mobile phase in the liquid delivery pump is non-equilibrium and non-stationary. The mobile phase is at room temperature in the suction process, but has a temperature increased by being adiabatically compressed in the pre-pressurizing process, and is cooled by exchanging heat with surrounding members such as a pump head and a pipe in a subsequent discharge process. Such a periodic temperature change of the mobile phase appears as a periodic variation of a liquid delivery flow rate through thermal expansion. Such a phenomenon is called thermal effect pulsation. As a method for solving this, performing heat compensation by performing constant pressure control of liquid delivery operation of the liquid delivery pump only in a specific section (mainly, a section during the discharge process of the plunger pump that has performed the pre-pressurizing process) of a liquid delivery cycle (see Patent Documents 2 to 5.).

In a case where the heat compensation is performed in the binary pump, even if each of the two liquid delivery pumps detects a system pressure, the system pressures detected in the liquid delivery pumps are substantially equal, and thus it is difficult to determine by which liquid delivery pump a fluctuation of the system pressure is caused. For this reason, when the constant pressure control sections of the two liquid delivery pumps overlap with each other, thermal effect pulsations are compensated between the two liquid delivery pumps, and there is rather a possibility that the accuracy of a liquid delivery flow rate ratio (mobile phase composition) of the two liquid delivery pumps is impaired. For this reason, in the case of performing heat compensation by constant pressure control in the binary pump, it is necessary to avoid the two liquid delivery pumps from performing constant pressure control at the same timing.

As a method of avoiding overlapping of the constant pressure control sections of the two liquid delivery pumps, for example, Patent Document 4 discloses that "when a control period collision is predicted, a pump with a longer pump cycle has its control period precedes sufficiently to avoid overlap with another pump control period". However, Patent Document 4 does not specifically disclose how to realize this.

As another method of avoiding the overlap of the constant pressure control sections of the two liquid delivery pumps, fixing (synchronizing) the liquid delivery cycles of the two liquid delivery pumps constituting the binary pump to a simple integer ratio (see Patent Documents 6 to 9.). In this method, the cycle of the liquid delivery pump on the low flow rate side is shortened in accordance with the cycle of the liquid delivery pump on the high flow rate side. For this reason, there is a problem that the pre-pressurizing process becomes short time and adiabatic, and the thermal effect pulsation becomes rather large. Further, since the plunger reciprocates a short distance in a short cycle, there is a possibility that the lifetime of a plunger seal is adversely affected.

An object of the present invention is to provide a binary pump having a configuration capable of avoiding overlapping of constant pressure control sections of two liquid delivery pumps.

Solutions to the Problems

The binary pump according to the present invention includes two liquid delivery pumps driven independently of each other. Each of the two liquid delivery pumps includes a primary plunger pump and a secondary plunger pump fluidly connected in series downstream of the primary plunger pump, and is configured to perform continuous liquid delivery by alternately repeating a primary discharge process in which the primary plunger pump performs discharge operation and a secondary discharge process in which the secondary plunger pump performs discharge operation. Each of the liquid delivery pumps includes a primary pressure sensor that detects a pressure in a pump chamber of the primary plunger pump. The binary pump includes a system pressure sensor that detects a system pressure, an operation state recognition part configured to recognize an operation state which is a position of a plunger of the primary plunger pump and a position of a plunger of the secondary plunger pump of each of the two liquid delivery pumps, and an operation controller configured to control operation of each of the two liquid delivery pumps. The operation controller is configured to cause each of the two liquid delivery pumps to execute, while the secondary discharge process is executed, a suction process, a first pre-pressurizing process, and a standby process in this order, the suction process is for sucking liquid by the primary plunger pump, the first pre-pressurizing process is for causing the primary plunger pump to perform discharge operation until a pressure in a pump chamber of the primary plunger pump becomes a pressure higher than atmospheric pressure and lower than the system pressure, and the standby process is for maintaining a pressure in the pump chamber of the primary plunger pump at a pressure lower than the system pressure until the plunger of the secondary plunger pump reaches a predetermined position. The operation controller is configured to cause each of the two liquid delivery pumps to execute a second pre-pressurizing process of increasing a pressure in the pump chamber of the primary plunger pump to the system pressure immediately before proceeding from the secondary discharge process to the primary discharge process. Furthermore, the operation controller is configured to cause, as long as continuous liquid delivery by each of the two liquid delivery pumps is not interrupted, at least one of the two liquid delivery pumps to execute avoidance operation of interrupting the standby process and proceeding to the second pre-pressurizing process by using the operation state of each of the two liquid delivery pumps recognized by the operation state recognition part, so as to avoid overlap of execution time zones of the primary discharge processes of the two liquid delivery pumps.

Here, "cause, as long as continuous liquid delivery by each of the two liquid delivery pumps is not interrupted, . . . so as to avoid overlap of execution time zones of the primary discharge processes of the two liquid delivery pumps" means that, in a case where, when at least one of the liquid delivery pumps is caused to execute the avoidance operation so as to avoid overlap of the execution time zones of the primary discharge processes of the two liquid delivery pumps, continuous liquid delivery of the other liquid delivery pump that does not execute the avoidance operation is interrupted, the execution time zones of the primary discharge processes of the two liquid delivery pumps may overlap each other.

Effects of the Invention

According to the binary pump of the present invention, as long as the continuous liquid delivery by each of the two liquid delivery pumps is not interrupted, at least one of the liquid delivery pumps executes the avoidance operation, so that overlap of the execution time zones of the primary discharge processes of the two liquid delivery pumps is avoided, and thus overlap of constant pressure control sections can be avoided.

BRIEF DESCRIPTION OF THE DRAWINGS

FIG. 3 is a flowchart for explaining operation cycles of a primary plunger pump and a secondary plunger pump of each liquid delivery pump of the binary pump of the embodiment.

FIG. 6 is a graph illustrating an example of an operation speed profile of each primary plunger of two liquid delivery pumps in the embodiment.

FIG. 7 is a graph illustrating another example of an operation speed profile of each primary plunger of two liquid delivery pumps in the embodiment.

FIG. 8 is a graph illustrating another example of an operation speed profile of each primary plunger of two liquid delivery pumps in the embodiment.

FIG. 9 is a graph illustrating another example of an operation speed profile of each primary plunger of two liquid delivery pumps in the embodiment.

FIG. 10 is a graph illustrating another example of an operation speed profile of each primary plunger of two liquid delivery pumps in the embodiment.

EMBODIMENTS OF THE INVENTION

Hereinafter, an embodiment of a binary pump according to the present invention will be described with reference to the drawings.

Figure 1:
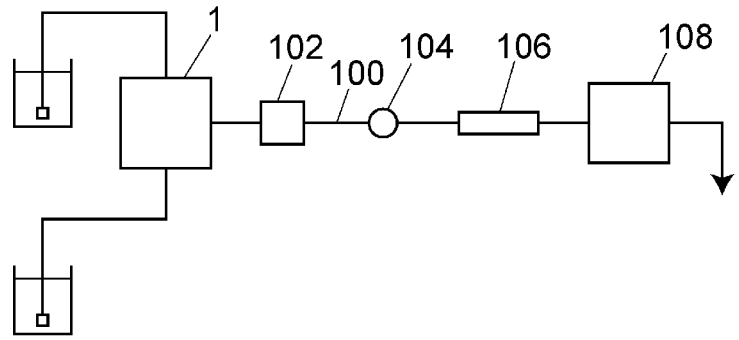
FIG. 1 is a schematic configuration diagram illustrating an example of a liquid chromatograph including a binary pump.

First, a liquid chromatograph using a binary pump will be described with reference to FIG. 1.

The liquid chromatograph includes a binary pump 1 for delivering a mobile phase in an analysis channel 100. The binary pump 1 includes two liquid delivery pumps 2A and 2B (see FIG. 2), and can deliver two types of mobile phases at a preset ratio by the liquid delivery pumps 2A and 2B. A mixer 102, a sample injector 104, a separation column 106, and a detector 108 are provided on the analysis channel 100. Note that the mixer 102 may be a part of constituents of the binary pump 1.

The two types of mobile phases delivered by the binary pump 1 are mixed in the mixer 102 and then flow through the analysis channel 100. The sample injector 104 injects a sample into a mobile phase flowing through the analysis channel 100. The sample injected into the mobile phase by the sample injector 104 is introduced into the separation column 106, and each component contained in the sample is temporally separated and sequentially eluted from the separation column 106. The components sequentially eluted from the separation column 106 are detected by the detector 108.

Figure 2:
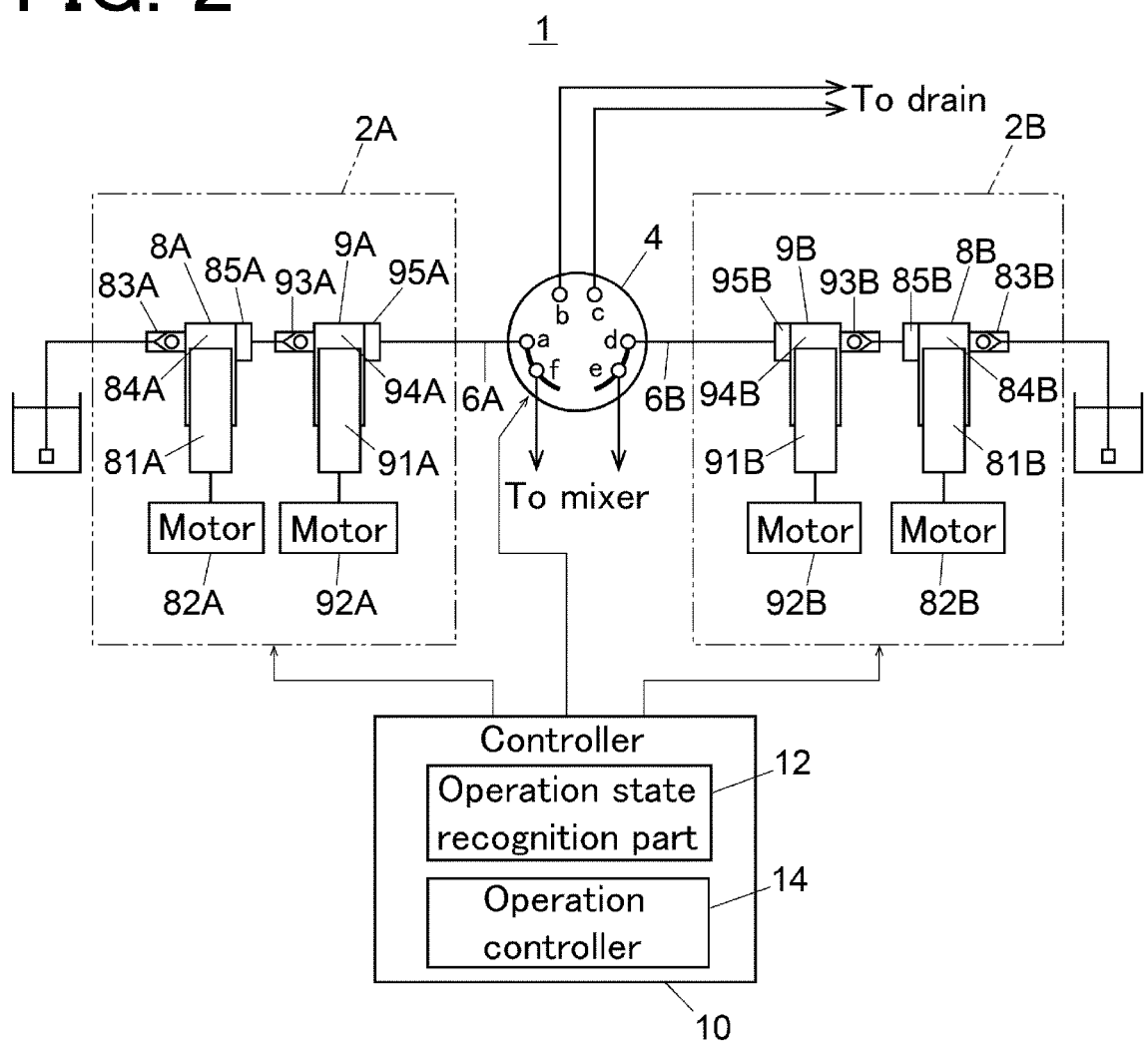
FIG. 2 is a schematic configuration diagram illustrating an embodiment of the binary pump.

FIG. 2 illustrates a schematic configuration of the binary pump 1.

The binary pump 1 includes two of the liquid delivery pumps 2A and 2B, a switching valve 4, and a controller 10. The liquid delivery pump 2A is connected to a port a of the switching valve 4 via a channel 6A, and the liquid delivery pump 2B is connected to a port d of the switching valve 4 via a channel 6B.

The switching valve 4 includes six ports a to f. A channel leading to the drain is connected to the ports b and c, and a channel leading to the mixer 102 (see FIG. 1) is connected to the ports e and f. The switching valve 4 can switch between a state in which the liquid delivery pumps 2A and/or 2B are fluidly connected to the mixer 102 (state of FIG. 2) and a state in which one of the liquid delivery pumps 2A and 2B is fluidly connected to the drain.

The liquid delivery pumps 2A and 2B have the same configuration, and two plunger pumps connected in series operate complementarily to realize continuous liquid delivery.

The liquid delivery pump 2A includes a primary plunger pump 8A and a secondary plunger pump 9A. A plunger 81A (hereinafter, the primary plunger 81A) of the primary plunger pump 8A is driven by a motor 82A, and a plunger 91A (hereinafter, the secondary plunger 91A) of the secondary plunger pump 9A is driven by a motor 92A. A check valve 83A is provided in an inlet portion to a pump chamber 84A of the primary plunger pump 8A, and a primary pressure sensor 85A is provided in an outlet portion from the pump chamber 84A. A check valve 93A is provided between an outlet of the pump chamber 84A of the primary plunger pump 8A and an inlet of a pump chamber 94A of the secondary plunger pump 9A, and a secondary pressure sensor 95A is provided in an outlet portion from the pump chamber 94A. The primary pressure sensor 85A is for detecting pressure in the pump chamber 84A of the primary plunger pump 8A, and the secondary pressure sensor 95A is for detecting liquid delivery pressure by the liquid delivery pump 2A. In a state where the liquid delivery pump 2A is connected to the mixer 102, the liquid delivery pressure by the liquid delivery pump 2A is substantially equal to a system pressure in the analysis channel 100. Therefore, the secondary pressure sensor 95A constitutes a system pressure sensor that detects the liquid delivery pressure by the liquid delivery pump 2A as a system pressure.

The liquid delivery pump 2B includes a primary plunger pump 8B and a secondary plunger pump 9B. A plunger 81B (hereinafter, the primary plunger 81B) of the primary plunger pump 8B is driven by a motor 82B, and a plunger 91B (secondary plunger 91B) of the secondary plunger pump 9B is driven by a motor 92B. A check valve 83B is provided in an inlet portion to a pump chamber 84B of the primary plunger pump 8B, and a primary pressure sensor 85B is provided in an outlet portion from the pump chamber 84B. A check valve 93B is provided between an outlet of the pump chamber 84B of the primary plunger pump 8B and an inlet of a pump chamber 94B of the secondary plunger pump 9B, and a secondary pressure sensor 95B is provided in an outlet portion from the pump chamber 94B. The primary pressure sensor 85B is for detecting pressure in the pump chamber 84B of the primary plunger pump 8B, and the secondary pressure sensor 95B is for detecting liquid delivery pressure by the liquid delivery pump 2B. In a state where the liquid delivery pump 2B is connected to the mixer 102, the liquid delivery pressure by the liquid delivery pump 2B is substantially equal to a system pressure in the analysis channel 100. Therefore, the secondary pressure sensor 95B constitutes a system pressure sensor that detects the liquid delivery pressure by the liquid delivery pump 2B as a system pressure.

Note that, in the present embodiment, each of the liquid delivery pumps 2A and 2B includes the system pressure sensor. However, the binary pump 1 may include a single system pressure sensor.

The operation of the liquid delivery pumps 2A and 2B is controlled by the controller 10. The controller 10 is realized by a dedicated computer or a general-purpose personal computer including a central processing unit (CPU), an information storage device, and the like. The controller 10 includes an operation state recognition part 12 and an operation controller 14. The operation state recognition part 12 and the operation controller 14 are functions realized by the CPU executing a program stored in the information storage device.

The operation state recognition part 12 is configured to recognize a process executed by each of the liquid delivery pumps 2A and 2B and the positions of the plungers 81A, 91A, 81B, and 91B as an operation state of each of the liquid delivery pumps 2A and 2B based on a driving signal given to the motors 82A, 92A, 82B, and 92B that drive the plunger pumps 8A, 9A, 8B, and 9B.

The operation controller 14 performs operation control of the plunger pumps 8A, 9A, 8B, and 9B so that the liquid delivery pumps 2A and 2B perform continuous liquid delivery at a set flow rate on the basis of an operation state of the liquid delivery pumps 2A and 2B recognized by the operation state recognition part 12. The operation controller 14 operates the plunger pumps 8A, 9A, 8B, and 9B in a cycle described below.

An operation cycle of the liquid delivery pumps 2A and 2B will be described with reference to FIG. 2 and the flowchart of FIG. 3. Note that, since the operation cycles of the liquid delivery pumps 2A and 2B are the same, only the operation cycle of the liquid delivery pump 2A will be described here.

The liquid delivery pump 2A realizes continuous liquid delivery by alternately and continuously executing a primary discharge process in which the primary plunger pump 8A performs discharge operation and a secondary discharge process in which the secondary plunger pump 9A performs discharge operation.

When the secondary plunger pump 9A starts the secondary discharge process (Step 201), the primary plunger pump 8A starts a suction process (Step 101). When the suction process ends (Step 102), the primary plunger pump 8A starts a first pre-pressurizing process (Step 103). In the first pre-pressurizing process, the pressure in the pump chamber 84A detected by the primary pressure sensor 85A is increased to a pressure higher than the atmospheric pressure and lower than the system pressure detected by the secondary pressure sensor 95A by a first specified value. The first specified value is a value of 50% or less (for example, 20%, 10%, 5%, or 2%) of the system pressure. Here, in the present embodiment, the "suction process" includes a top dead center standby process in which the primary plunger 81A temporarily stops at the top dead center and a bottom dead center standby process in which the primary plunger 81A temporarily stops at the bottom dead center. The top dead center standby process and the bottom dead center standby process are not essential processes.

After the first pre-pressurizing process is finished (Step 104), the primary plunger pump 8A proceeds to a standby process (Step 105). In the standby process, the operation of the first plunger 81A is substantially stopped, and the pressure in the pump chamber 84A is maintained at the pressure when the first pre-pressurizing process is finished. This standby process is continued until the secondary plunger 91A reaches a predetermined position unless avoidance operation described later is executed. When the secondary plunger 91A reaches the predetermined position, the primary plunger pump 8A ends the standby process and proceeds to a second pre-pressurizing process (Step 107). In the second pre-pressurizing process, the primary plunger pump 8A is caused to perform discharge operation to increase the pressure in the pump chamber 84A. When the pressure in the pump chamber 84A reaches a pressure lower than the system pressure by a second specified value, transition is made from the second pre-pressurizing process to the primary discharge process (Step 108). At this time, the secondary plunger pump 9A ends the secondary discharge process (Step 202), and proceeds to the suction process (Step 203). Here, the second specified value is a value of 5% or less (for example, 2%, 1%, 0.5%, or 0.2%) of the system pressure.

In the primary discharge process, constant pressure control is executed by operating the operation speed of the primary plunger 81A and/or the secondary plunger 91A so that the system pressure detected by the secondary pressure sensor 95A is kept constant at the system pressure immediately before shifting to the primary discharge process. As disclosed in Patent Documents 2 to 5, a target pressure of the constant pressure control is determined with reference to the system pressure in a time zone in which the constant pressure control is not executed (usually immediately before the constant pressure control is executed). Then, when the primary discharge process of the primary plunger pump 8A ends (Step 109), the secondary plunger pump ends the suction process and proceeds to the secondary discharge process (Steps 204 and 201).

As described above, in the liquid delivery pumps 2A and 2B of the present embodiment, the primary plunger pumps 8A and 8B execute the suction process, the first pre-pressurizing process, the standby process, and the second pre-pressurizing process while the secondary plunger pumps 9A and 9B execute the secondary discharge process.

Further, the operation controller 14 is configured to cause the plunger pump 8A and/or 9A of the liquid delivery pump 2A and the plunger pump 8B and/or 9B of the liquid delivery pump 2B to execute the avoidance operation to be described later as long as the continuous liquid delivery of the liquid delivery pumps 2A and 2B is not interrupted, so as to avoid overlap between an execution time zone of the primary discharge process by the liquid delivery pump 2A and an execution time zone of the primary discharge process by the liquid delivery pump 2B. The avoidance operation means advancing the transition to the second pre-pressurizing process by making the end time of the standby process earlier than the original time. In a case where the liquid delivery pump 2A is caused to execute the avoidance operation, the standby process of the primary plunger pump 8A ends before the secondary plunger 91A of the secondary plunger pump 9A executing the secondary discharge process reaches a predetermined position, and the processing proceeds to the second pre-pressurizing process.

Figure 4:
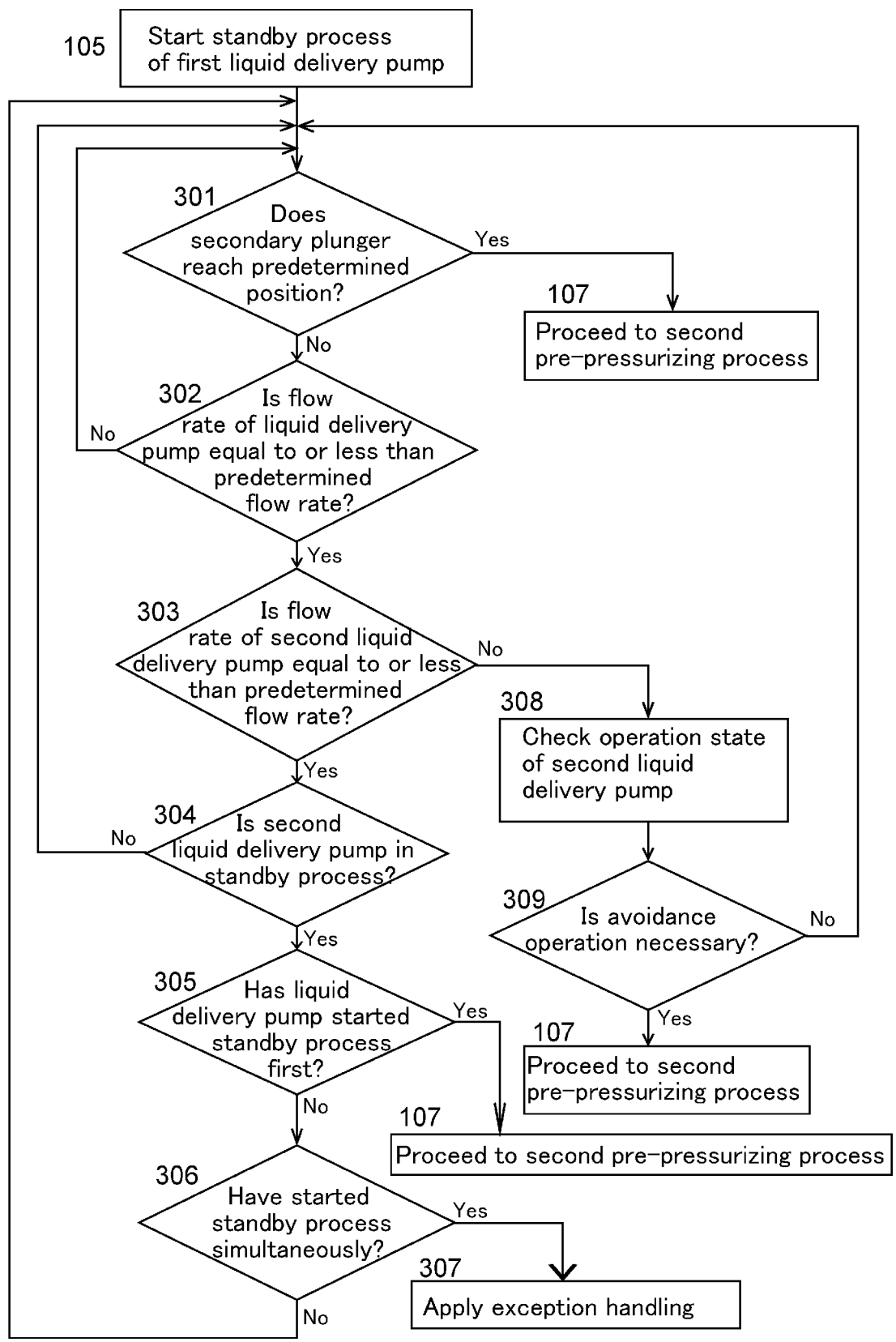
FIG. 4 is a flowchart illustrating operation control of a first liquid delivery pump during a standby process of the liquid delivery pump in the embodiment.

An example of an algorithm for executing the avoidance operation will be described with reference to the flowchart of FIG. 4 together with FIG. 2. A loop including Steps 301 to 309 of the algorithm described below is iteratively executed by the operation controller 14 at regular control cycles (for example, several milliseconds) for the liquid delivery pump that is executing the standby process. Here, the first liquid delivery pump 2A of the liquid delivery pumps 2A and 2B will be mainly described, but the same applies to the second liquid delivery pump 2B.

After the liquid delivery pump 2A starts the standby process (Step 105 in FIG. 3), it is confirmed whether the secondary plunger 91A reaches a predetermined position (Step 301). When the secondary plunger 91A reaches the predetermined position, the processing proceeds to the second pre-pressurizing process (Step 107 in FIG. 3). In a case where the secondary plunger 91A reaches the predetermined position (Step 301), it is confirmed whether a liquid delivery flow rate of the liquid delivery pump 2A at that time is equal to or less than a predetermined flow rate Qc (Step 302).

In a case where the liquid delivery flow rate of the liquid delivery pump 2A is equal to or less than the predetermined flow rate Qc, it is determined that the liquid delivery pump 2A can execute the avoidance operation, and it is checked whether or not a liquid delivery flow rate of the second liquid delivery pump 2B at that time is equal to or less than the predetermined flow rate Qc (Step 303). In contrast, in a case where the liquid delivery flow rate of the liquid delivery pump 2A exceeds the predetermined flow rate Qc, the standby process is continued.

In a case where the liquid delivery flow rates of the liquid delivery pump 2A and the liquid delivery pump 2B are both equal to or less than the predetermined flow rate Qc (Steps 302 and 303), if the second liquid delivery pump 2B is not in the standby process, the standby process is continued (Step 304). In a case where the second liquid delivery pump 2B is in the standby process (Step 304), it is checked which liquid delivery pump of the liquid delivery pumps 2A and 2B has proceeded to the standby process first (Step 305). In a case where the liquid delivery pump 2A has started the standby process first, the liquid delivery pump 2 is caused to end the standby process and proceed to the second pre-pressurizing process (Step 107 in FIG. 3) (Step 305). In a case where the liquid delivery pump 2A and the liquid delivery pump 2B simultaneously have started the standby process, exception handling is applied (Steps 306 and 307). In a case where the liquid delivery pump 2B has started the standby process first, the liquid delivery pump 2A is caused to continue the standby process. Examples of the "exception handling" include causing any one of the liquid delivery pumps 2A and 2B set in advance to end the standby process and proceed to the primary discharge process. Further, in a case where the liquid delivery flow rate of the liquid delivery pump 2A is different from the liquid delivery flow rate of the liquid delivery pump 2B, the liquid delivery pump having a larger liquid delivery flow rate may be caused to end the standby process and proceed to the second pre-pressurizing process as the "exception handling".

It is possible to determine which of the liquid delivery pumps 2A and 2B has started the standby process first by comparing a state of each of the liquid delivery pumps 2A and 2B in a previous control cycle with a current state of each of the liquid delivery pumps 2A and 2B and checking whether or not each of the liquid delivery pumps 2A and 2B has just started the standby process. In order to perform such determination for each control cycle, the determination that the liquid delivery pumps 2A and 2B have simultaneously started the standby process in Step 306 is limited to a case where both the liquid delivery pumps 2A and 2B have just started the standby process.

In a case where the liquid delivery flow rate of the liquid delivery pump 2A is equal to or less than the predetermined flow rate Qc while the liquid delivery flow rate of the liquid delivery pump 2B exceeds the predetermined flow rate Qc, an operation state of the liquid delivery pump 2B is checked (Step 308), and based on the operation state of the liquid delivery pump 2B, it is determined whether or not the avoidance operation of the liquid delivery pump 2A is necessary to avoid overlap between an execution time zone of the primary discharge process by the liquid delivery pump 2A and an execution time zone of the primary discharge process by the liquid delivery pump 2B (Step 309). An algorithm of necessity determination of the avoidance operation will be described later. In a case where it is determined that the avoidance operation is necessary, the liquid delivery pump 2A is caused to end the standby process and proceed to the second pre-pressurizing process. In contrast, in a case where it is determined that the avoidance operation is unnecessary, the liquid delivery pump 2A is caused to continue the standby process.

Here, the flow rate value Qc serving as a reference for determining whether or not the liquid delivery pumps 2A and 2B can perform the avoidance operation is a flow rate value set in consideration of whether or not time of a length capable of securing an adjustment width by which overlap between the execution time zone of the primary discharge process by the liquid delivery pump 2A and the execution time zone of the primary discharge process by the liquid delivery pump 2B can be avoided is allocated to the standby process. In a case where the liquid delivery flow rates of the liquid delivery pumps 2A and 2B are both the predetermined flow rate Qc or less, in order for both the liquid delivery pumps 2A and 2B to effectively execute the avoidance operation, the standby process time of one of the liquid delivery pumps 2A and 2B needs to be longer than the primary discharge time of the other. Further, in the binary pump 1, a maximum total flow rate Qt of the liquid delivery pumps 2A and 2B is usually determined. In a case where a liquid delivery flow rate of one of the liquid delivery pumps 2A and 2B exceeds the predetermined flow rate Qc, a liquid delivery flow rate of the other one is equal to or less than Qt−Qc. In this case, in order to avoid overlap of the primary discharge process time by the avoidance operation of the liquid delivery pump in which a liquid delivery flow rate is equal to or less than Qt−Qc, the standby process time of the liquid delivery pump needs to be longer than twice the primary discharge time of the other liquid delivery pump.

Figure 5:
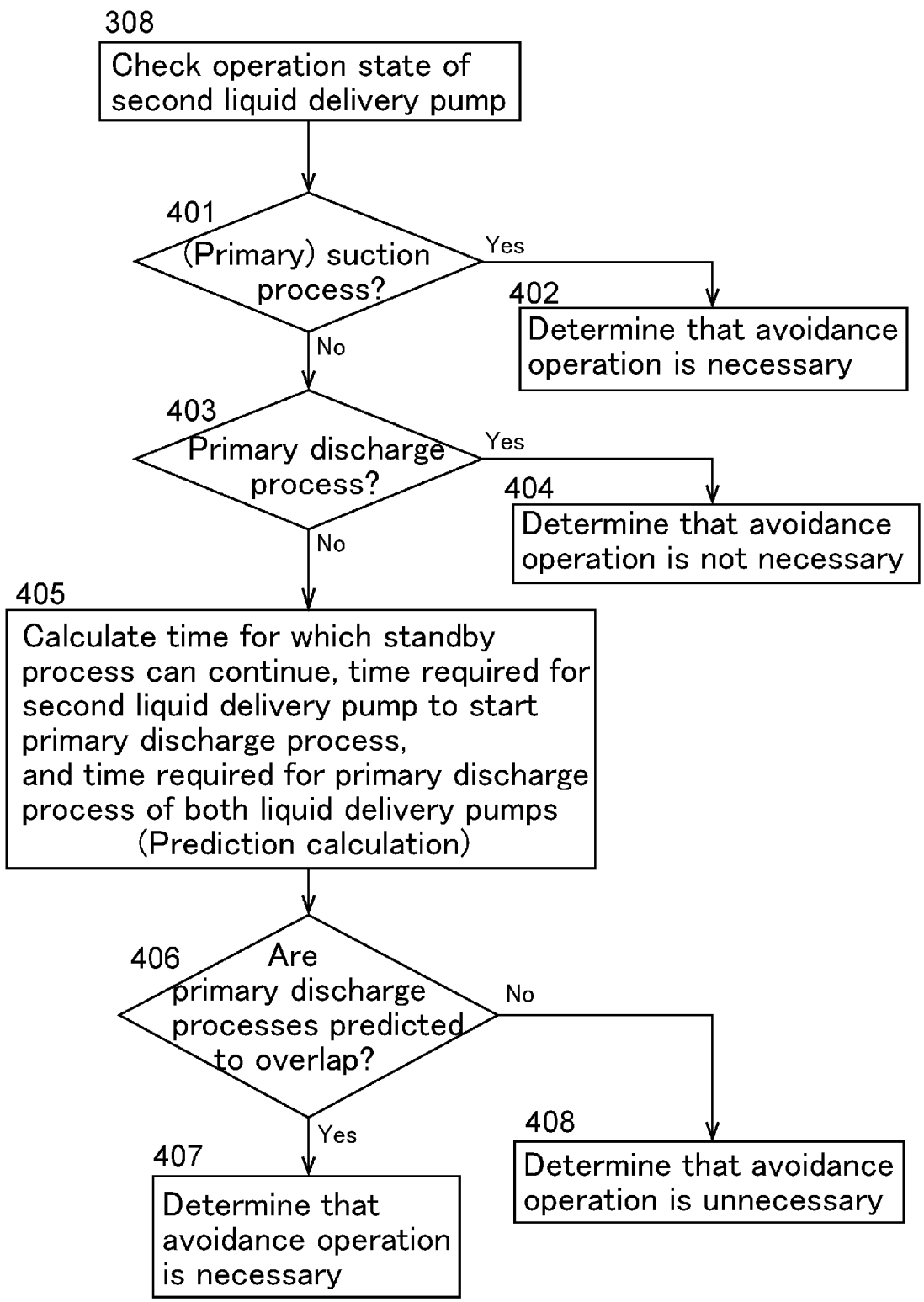
FIG. 5 is a flowchart illustrating an example of an algorithm of determination of necessity of avoidance operation when a liquid delivery flow rate of a first liquid delivery pump is a predetermined flow rate or less and a liquid delivery flow rate of a second liquid delivery pump exceeds a predetermined flow rate in the embodiment.

Next, an example of an algorithm of the necessity determination of the avoidance operation of the liquid delivery pump 2A in a case where the liquid delivery flow rate of the first liquid delivery pump 2A is equal to or less than the predetermined flow rate Qc and the liquid delivery flow rate of the second liquid delivery pump 2B exceeds the predetermined flow rate Qc will be described with reference to the flowchart of FIG. 5 together with FIG. 2.

As a result of checking an operation state of the second liquid delivery pump 2B in Step 308 of the flowchart of FIG. 3, in a case where the liquid delivery pump 2B is in the suction process of the primary plunger pump 8B, it is determined that the avoidance operation by the first liquid delivery pump 2A is necessary (Steps 401 and 402). This is because, when the liquid delivery pump 2B is in the suction process of the primary plunger pump 8B, there is still a time margin before the liquid delivery pump 2B starts the primary discharge process, and thus, as the liquid delivery pump 2A immediately proceeds to the second pre-pressurizing process and the primary discharge process, overlap of the primary discharge processes of the liquid delivery pump 2A and the liquid delivery pump 2B may be avoided. In contrast, in a case where the liquid delivery pump 2B is in the primary discharge process, it is determined that the avoidance operation by the liquid delivery pump 2A is unnecessary (Step 404). In this manner, the liquid delivery pump 2A starting the second pre-pressurizing process and the primary discharge operation during the primary discharge process of the liquid delivery pump 2B can be avoided.

In a case where the liquid delivery pump 2B is neither in the suction process nor in the primary discharge process of the primary plunger pump 8B, predicted values of time required for starting the primary discharge process in a case where the primary plunger pump 8A continues the standby process, time required for the liquid delivery pump 2B to start the primary discharge process, time required for the primary discharge process of the liquid delivery pump 2A, and time required for the primary discharge process of the liquid delivery pump 2B are calculated using the liquid delivery flow rates of the liquid delivery pumps 2A and 2B and the operation states of the primary plunger 81A, the secondary plunger 91A of the liquid delivery pump 2A and the primary plunger 81B and the secondary plunger 91B of the liquid delivery pump 2B recognized by the operation state recognition part 12 (predicted calculation). Using this prediction calculation, it is predicted whether or not the execution time zones of the primary discharge process of the liquid delivery pump 2A and the primary discharge process of the liquid delivery pump 2B may overlap (Step 406). In a case where the execution time zones of the primary discharge processes of the liquid delivery pumps 2A and 2B are predicted to overlap, it is determined that the avoidance operation of the liquid delivery pump 2A is necessary (Step 407). In contrast, in a case where it is predicted that the execution time zones of the primary discharge processes of the liquid delivery pumps 2A and 2B do not overlap, it is determined that the avoidance operation of the liquid delivery pump 2A is unnecessary (Step 408).

Here, the "time required for starting the primary discharge process in a case where the primary plunger pump 8A continues the standby process" is predictively calculated from time until the secondary plunger pump 9A reaches a predetermined position near the top dead center. That is, it is calculated by dividing a difference between the current position of the secondary plunger pump 9A and a predetermined position that is near the top dead center and serves as a reference for the start of the primary discharge process by operation speed of the secondary plunger pump 9A (uniquely determined from the liquid delivery flow rate of the liquid delivery pump 2A).

Similarly, the "time required for the liquid delivery pump 2B to start the primary discharge process" is predictively calculated from time until the secondary plunger pump 9B reaches a predetermined position near the top dead center. That is, it is calculated by dividing a difference between the current position of the secondary plunger pump 9B and a predetermined position that is near the top dead center and serves as a reference for the start of the primary discharge process by operation speed of the secondary plunger pump 9B (uniquely determined from the liquid delivery flow rate of the liquid delivery pump 2B).

Further, the "time required for the primary discharge process of the liquid delivery pump 2A" is calculated by dividing a movement distance of the primary plunger pump 8A in the discharge process by operation speed (usually having a trapezoidal profile) determined in advance.

Similarly, the "time required for the primary discharge process of the liquid delivery pump 2B" is calculated by dividing a movement distance of the primary plunger pump 8B in the discharge process by operation speed (usually having a trapezoidal profile) determined in advance.

Briefly summarizing the above algorithm, when the liquid delivery flow rates of the liquid delivery pumps 2A and 2B are both equal to or less than the predetermined flow rate, it is determined whether or not any one of the liquid delivery pumps 2A and 2B has proceeded to the standby process first at the time when both of the liquid delivery pumps 2A and 2B proceed to the standby process, the liquid delivery pump that has proceeded to the standby process first is caused to execute the avoidance operation, and the exception handling is applied in a case where the liquid delivery pumps 2A and 2B proceed to the standby process simultaneously. In a case where the liquid delivery flow rate of any one of the liquid delivery pumps 2A and 2B is equal to or less than the predetermined flow rate and the liquid delivery flow rate of the second liquid delivery pump exceeds the predetermined flow rate, the operation state of the second liquid delivery pump is checked at the time when the liquid delivery pump whose liquid delivery flow rate is equal to or less than the predetermined flow rate proceeds to the standby process, and the second liquid delivery pump is caused to execute the avoidance operation or continue the standby process without executing the avoidance operation according to the operation state.

FIG. 6 is an operation speed profile of the primary plunger of each of the liquid delivery pumps 2A and 2B in a case where the liquid delivery flow rates of both the liquid delivery pumps 2A and 2B are equal to or less than a predetermined flow rate at which the avoidance operation can be executed.

In the profile of FIG. 6, at a time t1, the liquid delivery pump 2A is in the first pre-pressurizing process, and the liquid delivery pump 2B proceeds to the standby process. For this reason, the liquid delivery pump 2B continues the standby process. At a time t2, the liquid delivery pump 2A also proceeds to the standby process. At this time, the liquid delivery pump 2B is also in the standby process, and both the liquid delivery pumps 2A and 2B are in the state during the standby process. Since the liquid delivery pump 2B has started the standby process first, the liquid delivery pump 2B executes the avoidance operation and immediately proceeds from the standby process to the second pre-pressurizing process. A time t3 is a predicted end time of the standby process in a case where the liquid delivery pump 2B does not execute the avoidance operation. In a case where the standby process is continued until the time t3, it is predicted that the execution time zones of the primary discharge processes of the liquid delivery pumps 2A and 2B overlap. However, the overlap of the primary discharge processes of the liquid delivery pumps 2A and 2B is avoided by the liquid delivery pump 2B executing the avoidance operation.

Each of FIGS. 7 to 10 is an operation speed profile of the primary plunger of each of the liquid delivery pumps 2A and 2B in a case where the liquid delivery flow rate of the liquid delivery pump 2A exceeds the predetermined flow rate at which the avoidance operation can be executed and the liquid delivery flow rate of the liquid delivery pump 2B is equal to or less than the predetermined flow rate at which the avoidance operation can be executed. In the case shown in FIGS. 7 to 10, the liquid delivery pump 2A cannot execute the avoidance operation because the liquid delivery flow rate exceeds the predetermined flow rate. For this reason, regardless of the operation state of the liquid delivery pump 2B, the liquid delivery pump 2A continues the standby process of the primary plunger pump 8A until the secondary plunger 91A reaches the predetermined position.

In the profile of FIG. 7, at a time t4, the liquid delivery pump 2B ends the first pre-pressurizing process of the primary plunger pump 8B and proceeds to the standby process. At this time, the liquid delivery pump 2A is in the suction process of the primary plunger pump 8A. For this reason, the liquid delivery pump 2B executes the avoidance operation, immediately ends the standby process of the primary plunger pump 8B, and proceeds to the second pre-pressurizing process. In a case where the avoidance operation is not executed, it is predicted that the standby process of the primary plunger pump 8B is continued until a time t5. However, it can be seen that the second pre-pressurizing process and the primary discharge process are executed earlier by execution of the avoidance operation. Note that, since a time zone in which the liquid delivery pump 2B executes the standby process is a little, FIG. 7 is drawn in a manner that the first pre-pressurizing process seems to directly proceed to the second pre-pressurizing process.

In the profile of FIG. 8, at a time t6, the liquid delivery pump 2B ends the first pre-pressurizing process of the primary plunger pump 8B and proceeds to the standby process. At this time, the liquid delivery pump 2A is in the primary discharge process of the primary plunger pump 8A. For this reason, the liquid delivery pump 2B does not execute the avoidance operation, and continues the standby process of the primary plunger pump 8B. The primary discharge process of the liquid delivery pump 2A ends during the standby process of the liquid delivery pump 2B. This avoids overlap of the primary discharge processes of the liquid delivery pumps 2A and 2B.

In the profile of FIG. 9, at a time t8, the liquid delivery pump 2B ends the first pre-pressurizing process of the primary plunger pump 8B and proceeds to the standby process. At this time, the liquid delivery pump 2A is in the first pre-pressurizing process of the primary plunger pump 8A. Since the liquid delivery pump 2A is in a process other than the suction process and is in a process other than the primary discharge process, prediction calculation is executed. In the prediction calculation, predicted values of time ΔT required for the primary discharge process, a start time T1 of the primary discharge of the liquid delivery pump 2A, an end time T2 (=T1+ΔT) of the primary discharge process, a start time t10 of the primary discharge process of the liquid delivery pump 2B, and time Δt required for the primary discharge process are calculated. As a result of the prediction calculation, since the predicted start time T1 of the primary discharge of the liquid delivery pump 2A is before the predicted start time t10 of the primary discharge process of the liquid delivery pump 2B, and the predicted end time T2 of the primary discharge of the liquid delivery pump 2A is also before the predicted start time t10 of the primary discharge process of the liquid delivery pump 2B, it is predicted that the execution time zones of the primary discharge processes of the liquid delivery pumps 2A and 2B do not overlap even if the liquid delivery pump 2B continues the standby process. For this reason, the liquid delivery pump 2B does not execute the avoidance operation, and the standby process is continued.

In the profile of FIG. 10, at a time t11, the liquid delivery pump 2B ends the first pre-pressurizing process of the primary plunger pump 8B and proceeds to the standby process. At this time, the liquid delivery pump 2A is in the first pre-pressurizing process of the primary plunger pump 8A. For this reason, the prediction calculation is executed, and predicted values of a start time T3 of the primary discharge process of the liquid delivery pump 2A, time ΔT required for the primary discharge process, an end time T4 (=T3+ΔT) of the primary discharge process, a start time t13 of the primary discharge process of the liquid delivery pump 2B, and time Δt required for the primary discharge process are calculated. As a result of the prediction calculation, although the predicted start time T3 of the primary discharge of the liquid delivery pump 2A is before the predicted start time t13 of the primary discharge process of the liquid delivery pump 2B, the predicted end time T4 of the primary discharge of the liquid delivery pump 2A is after the predicted start time t13 of the primary discharge process of the liquid delivery pump 2B. For this reason, it is predicted that the execution time zones of the primary discharge processes of the liquid delivery pumps 2A and 2B overlap if the liquid delivery pump 2B continues the standby process. For this reason, the liquid delivery pump 2B executes the avoidance operation, immediately ends the standby process, and executes the second pre-pressurizing process and the primary discharge process. In this manner, the liquid delivery pump 2B ends the primary discharge process before the liquid delivery pump 2A starts the primary discharge process, and overlap of the execution time zones of the primary discharge processes of the liquid delivery pumps 2A and 2B is avoided.

Further, in the cases of FIGS. 9 and 10, as a result of the prediction calculation, there may be a case where the primary discharge process of the liquid delivery pump 2B is predicted to be started before the primary discharge process of the liquid delivery pump 2A. In this case, whether or not the liquid delivery pump 2A starts the primary discharge process during the primary discharge process of the liquid delivery pump 2B is predicted using the predicted end time (t10+Δt or t13+Δt) of the primary discharge process of the liquid delivery pump 2B, and in a case where the primary discharge process is predicted to be started, the liquid delivery pump 2B is caused to execute the avoidance operation, the standby process is immediately ended, and the second pre-pressurizing process and the primary discharge process are executed. In this manner, the liquid delivery pump 2B ends the primary discharge process before the liquid delivery pump 2A starts the primary discharge process, and overlap of the execution time zones of the primary discharge processes of the liquid delivery pumps 2A and 2B is avoided.

As described above, in the binary pump 1 of the present embodiment, since the standby process for maintaining the pressure in the pump chambers 84A and 84B of the primary plunger pumps 8A and 8B of the liquid delivery pumps 2A and 2B at a pressure lower than the system pressure but higher than the atmospheric pressure is introduced in the previous stage of the primary discharge process of the liquid delivery cycle of the liquid delivery pumps 2A and 2B, transition can be made from the standby process to the primary discharge process in a short time, and the uncertainty of time from the completion of the pre-pressurizing to the start of the primary discharge process is reduced. Further, in the first pre-pressurizing process, although a mobile phase is compressed in the pump chambers 84A and 84B and generates heat, the heat generation of the mobile phase is stopped during the subsequent standby process to promote cooling. Accordingly, thermal effect pulsation is suppressed. Then, since the time of the standby process is adjusted to avoid overlap of the execution time zones of the primary discharge processes of the two liquid delivery pumps 2A and 2B, it is possible to avoid overlap of the constant pressure control sections of the two liquid delivery pumps 2A and 2B.

The embodiments described above merely illustrate an example of embodiments of the binary pump according to the present invention. The embodiments of the binary pump according to the present invention are as follows.

An embodiment of a binary pump according to the present invention is a binary pump including two liquid delivery pumps driven independently of each other. Each of the two liquid delivery pumps includes a primary plunger pump and a secondary plunger pump fluidly connected in series downstream of the primary plunger pump, and is configured to perform continuous liquid delivery by alternately repeating a primary discharge process in which the primary plunger pump performs discharge operation and a secondary discharge process in which the secondary plunger pump performs discharge operation, each of the liquid delivery pumps includes a primary pressure sensor that detects a pressure in a pump chamber of the primary plunger pump, the binary pump includes: a system pressure sensor that detects the system pressure; an operation state recognition part configured to recognize an operation state which is a position of a plunger of the primary plunger pump and a position of a plunger of the secondary plunger pump of each of the two liquid delivery pumps; and an operation controller configured to control operation of each of the two liquid delivery pumps. The operation controller is configured to cause each of the two liquid delivery pumps to execute, while the secondary discharge process is executed, a suction process, a first pre-pressurizing process, and a standby process in this order, the suction process is for sucking liquid by the primary plunger pump, the first pre-pressurizing process is for causing the primary plunger pump to perform discharge operation until a pressure in a pump chamber of the primary plunger pump becomes a pressure higher than atmospheric pressure and lower than the system pressure, and the standby process is for maintaining a pressure in the pump chamber of the primary plunger pump at a pressure lower than the system pressure until the plunger of the secondary plunger pump reaches a predetermined position. The operation controller is configured to cause each of the two liquid delivery pumps to execute a second pre-pressurizing process of increasing a pressure in the pump chamber of the primary plunger pump to the system pressure immediately before proceeding from the secondary discharge process to the primary discharge process. Furthermore, the operation controller is configured to cause, as long as continuous liquid delivery by each of the two liquid delivery pumps is not interrupted, at least one of the two liquid delivery pumps to execute avoidance operation of interrupting the standby process and proceeding to the second pre-pressurizing process by using the operation state of each of the two liquid delivery pumps recognized by the operation state recognition part, so as to avoid overlap of execution time zones of the primary discharge processes of the two liquid delivery pumps.

In a first aspect of the embodiment of the binary pump according to the present invention, the operation controller is configured, when one of the two liquid delivery pumps is in the primary discharge process, to execute constant pressure control by controlling operation speed of the primary plunger pump and/or the secondary plunger pump of the liquid delivery pump executing the primary discharge process. A target pressure of the constant pressure control is determined with reference to the system pressure in a time zone in which the constant pressure control is not executed (usually immediately before the constant pressure control is executed). According to such an aspect, it is possible to suppress the occurrence of the thermal effect pulsation caused by the pre-pressurizing process of the primary plunger pump.

In a second aspect of the embodiment of the binary pump according to the present invention, the operation controller is configured to cause only a liquid delivery pump having a liquid delivery flow rate equal to or less than a predetermined flow rate between the two liquid delivery pumps to execute the avoidance operation. In a liquid delivery pump having a high liquid delivery flow rate, the operation cycle of the primary plunger pump is also short, and thus sufficient time cannot be secured for the standby process. For this reason, even if the time of the standby process of the liquid delivery pump having a high liquid delivery flow rate is adjusted, it is considered that the overlap of the execution time zones of the primary discharge processes of the two liquid delivery pumps cannot be avoided. That is, the "predetermined flow rate" is a flow rate serving as a reference for determining whether or not each of the liquid delivery pumps can execute the avoidance operation, and is a value set in consideration of whether or not time having a length by which an adjustment width for avoiding overlap of the execution time zones of the primary discharge processes of the two liquid delivery pumps can be secured is allocated to the standby process. Therefore, by causing only the liquid delivery pump having a liquid delivery flow rate of the "predetermined flow rate" or less to execute the avoidance operation, it becomes easier to avoid overlap of the execution time zones of the primary discharge processes of the two liquid delivery pumps.

In a first specific example of the second aspect, in a case where a first liquid delivery pump of the two liquid delivery pumps is in the standby process and liquid delivery flow rates of both of the two liquid delivery pumps are the predetermined flow rate or less, the operation controller is configured to cause the first liquid delivery pump to continue the standby process unless a second liquid delivery pump of the two liquid delivery pumps is in the standby process; and the operation controller is configured to cause one of the first and second liquid delivery pumps that has proceeded to the standby process firster than the other to execute the avoidance operation if the second liquid delivery pump is also in the standby process. Since it is predicted that the liquid delivery pump that has proceeded to the standby process first proceeds to the second pre-pressurizing process and the primary discharge process earlier than the liquid delivery pump that has proceeded to the standby process later, by causing the liquid delivery pump that has proceeded to the standby process first to execute the avoidance operation, it becomes easier to avoid overlap of the execution time zones of the primary discharge processes.

In the first specific example, maximum time for the standby process of the first liquid delivery pump of the two liquid delivery pumps can be made longer than time required for the primary discharge process of the second liquid delivery pump. This makes it easy to avoid overlap of the execution time zones of the primary discharge processes.

Further, in a second specific example of the second aspect, in a case where a first liquid delivery pump of the two liquid delivery pumps is in the standby process, and a liquid delivery flow rate of the first liquid delivery pump is the predetermined flow rate or less and that of a second liquid delivery pump is higher than the predetermined flow rate, the operation controller is configured to determine whether to cause the first liquid delivery pump to continue the standby process or execute the avoidance operation according to an operation state of the second liquid delivery pump recognized by the operation state recognition part, and to control operation of the first liquid delivery pump based on the determination.

In the second specific example, when the first liquid delivery pump is in the standby process and the second liquid delivery pump is in the primary discharge process, the operation controller may be configured to cause the first liquid delivery pump to continue the standby process.

In this manner, it is possible to avoid overlap of the execution time zones of the primary discharge processes of the two liquid delivery pumps.

Further, in the second specific example, in a case where the first liquid delivery pump is in the standby process and the second liquid delivery pump is in the suction process, the operation controller may be configured to cause the first liquid delivery pump to execute the avoidance operation. When the second liquid delivery pump is in the suction process, it is considered that a certain amount of time is required until the second liquid delivery pump executes the primary discharge process. Therefore, by causing the first liquid delivery pump to execute the second pre-pressurizing process and the first discharge operation earlier, it becomes easy to avoid overlap of the execution time zones of the primary discharge processes of the two liquid delivery pumps.

Further, in the second specific example, in a case where the first liquid delivery pump is in the standby process and the second liquid delivery pump is in a process other than the suction process and a process other than the discharge process, the operation controller may be configured to execute prediction calculation. In the prediction calculation, time required for the primary discharge process of the first liquid delivery pump and time required for the primary discharge process of the second liquid delivery pump are calculated, in addition, time required for proceeding to the primary discharge process in a case where the first liquid delivery pump does not execute the avoidance operation and time required for the second liquid delivery pump to proceed to the primary discharge process are calculated by using a position of a plunger of the secondary plunger pump of the first liquid delivery pump and a position of a plunger of the secondary plunger pump of the second liquid delivery pump. Furthermore, the operation controller may be configured to predict, from a result of the prediction calculation, whether or not an execution time zone of the primary discharge process of the first liquid delivery pump and an execution time zone of the primary discharge process of the second liquid delivery pump overlap if the first liquid delivery pump does not execute the avoidance operation; and cause the first liquid delivery pump to continue the standby process when it is predicted that the execution time zone of the primary discharge process of the first liquid delivery pump and the execution time zone of the primary discharge process of the second liquid delivery pump do not overlap each other as a result of the prediction. Furthermore, the operation controller may be configured to cause the first liquid delivery pump to continue the standby process when a result of the prediction is that the execution time zone of the primary discharge process of the first liquid delivery pump and the execution time zone of the primary discharge process of the second liquid delivery pump do not overlap each other, and to cause the first liquid delivery pump to execute the avoidance operation when the result of the prediction is that the execution time zone of the primary discharge process of the first liquid delivery pump and the execution time zone of the primary discharge process of the second liquid delivery pump overlap each other. As described above, whether or not the execution time zones of the primary discharge processes of the two liquid delivery pumps overlap with each other is predicted by calculation from an operation state of the second liquid delivery pump that does not execute the avoidance operation, and whether or not to cause the first liquid delivery pump to execute the avoidance operation is determined on the basis of a result of the prediction, so that overlap of the execution time zones of the primary discharge processes of the two liquid delivery pumps can be more reliably avoided.

In the second specific example, maximum time of the standby process of the first liquid delivery pump may be twice or more time required for the primary discharge process of the second liquid delivery pump. According to such an aspect, if it is appropriately determined whether to cause the first liquid delivery pump to continue the standby process or execute the avoidance operation, it becomes easy to avoid overlap of the execution time zones of the primary discharge processes of the two liquid delivery pumps.

The first and second aspects of the above embodiments can be combined with each other. Further, the first and second specific examples of the second aspect can be combined with each other.

DESCRIPTION OF REFERENCE SIGNS

1: Binary pump
2A, 2B: Liquid delivery pump
4: Switching valve
6A, 6B: Channel
8A, 8B: Primary plunger pump
9A, 9B: Secondary plunger pump
10: Controller
12: Operation state recognition part
14: Operation controller
81A, 81B: Primary plunger
82A, 82B, 92A, 92B: Motor
83A, 83B, 93A, 93B: Check valve
84A, 84B, 94A, 94B: Pump chamber
85A, 85B, 95A, 95B: Pressure sensor
100: Analysis channel
102: Mixer
104: Sample injector
106: Separation column
108: Detector

The invention claimed is:

1. A binary pump comprising two liquid delivery pumps driven independently of each other, wherein
each of the two liquid delivery pumps includes a primary plunger pump and a secondary plunger pump fluidly connected in series downstream of the primary plunger pump, and is configured to perform continuous liquid delivery by alternately repeating a primary discharge process in which the primary plunger pump performs discharge operation and a secondary discharge process in which the secondary plunger pump performs discharge operation,
each of the liquid delivery pumps includes a primary pressure sensor that detects a pressure in a pump chamber of the primary plunger pump,
the binary pump includes:
a system pressure sensor that detects the system pressure;
an operation state recognition part configured to recognize an operation state which is a position of a plunger of the primary plunger pump and a position of a plunger of the secondary plunger pump of each of the two liquid delivery pumps; and
an operation controller configured to control operation of each of the two liquid delivery pumps, and
the operation controller is configured to cause each of the two liquid delivery pumps to execute, while the secondary discharge process is executed, a suction process, a first pre-pressurizing process, and a standby process in this order, the suction process is for sucking liquid by the primary plunger pump, the first pre-pressurizing process is for causing the primary plunger pump to perform discharge operation until a pressure in a pump chamber of the primary plunger pump becomes a pressure higher than atmospheric pressure and lower than the system pressure, and the standby process is for maintaining a pressure in the pump chamber of the primary plunger pump at a pressure lower than the system pressure until the plunger of the secondary plunger pump reaches a predetermined position,
the operation controller is configured to cause each of the two liquid delivery pumps to execute a second pre-pressurizing process of increasing a pressure in the pump chamber of the primary plunger pump to the system pressure immediately before proceeding from the secondary discharge process to the primary discharge process; and
the operation controller is configured to cause, as long as continuous liquid delivery by each of the two liquid delivery pumps is not interrupted, at least one of the two liquid delivery pumps to execute avoidance operation of interrupting the standby process and proceeding to the second pre-pressurizing process by using the operation state of each of the two liquid delivery pumps recognized by the operation state recognition part, so as to avoid overlap of execution time zones of the primary discharge processes of the two liquid delivery pumps.

2. The binary pump according to claim 1, wherein the operation controller is configured, when one of the two liquid delivery pumps is in the primary discharge process, to execute constant pressure control by controlling operation speed of the primary plunger pump and/or the secondary plunger pump of the liquid delivery pump executing the primary discharge process.

3. The binary pump according to claim 1, wherein the operation controller is configured to cause only a liquid delivery pump having a liquid delivery flow rate equal to or less than a predetermined flow rate between the two liquid delivery pumps to execute the avoidance operation.

4. The binary pump according to claim 3, wherein
in a case where a first liquid delivery pump of the two liquid delivery pumps is in the standby process and liquid delivery flow rates of both of the two liquid delivery pumps are the predetermined flow rate or less,
the operation controller is configured to cause the first liquid delivery pump to continue the standby process unless a second liquid delivery pump of the two liquid delivery pumps is in the standby process; and
the operation controller is configured to cause one of the first and second liquid delivery pumps that has proceeded to the standby process firster than the other to execute the avoidance operation if the second liquid delivery pump is also in the standby process.

5. The binary pump according to claim 4, wherein maximum time for the standby process of the first liquid delivery pump of the two liquid delivery pumps is longer than time required for the primary discharge process of the second liquid delivery pump.

6. The binary pump according to claim 3, wherein
in a case where a first liquid delivery pump of the two liquid delivery pumps is in the standby process, and a liquid delivery flow rate of the first liquid delivery pump is the predetermined flow rate or less and that of a second liquid delivery pump is higher than the predetermined flow rate,
the operation controller is configured to determine whether to cause the first liquid delivery pump to continue the standby process or execute the avoidance operation according to an operation state of the second liquid delivery pump recognized by the operation state recognition part, and to control operation of the first liquid delivery pump based on the determination.

7. The binary pump according to claim 6, wherein
when the first liquid delivery pump is in the standby process and the second liquid delivery pump is in the primary discharge process,
the operation controller is configured to cause the first liquid delivery pump to continue the standby process.

8. The binary pump according to claim 6, wherein
in a case where the first liquid delivery pump is in the standby process and the second liquid delivery pump is in the suction process,
the operation controller is configured to cause the first liquid delivery pump to execute the avoidance operation.

9. The binary pump according to claim 6, wherein
in a case where the first liquid delivery pump is in the standby process and the second liquid delivery pump is in a process other than the suction process and a process other than the discharge process,
the operation controller is configured to execute prediction calculation, in the prediction calculation, time required for the primary discharge process of the first liquid delivery pump and time required for the primary discharge process of the second liquid delivery pump are calculated, in addition, time required for proceeding to the primary discharge process in a case where the first liquid delivery pump does not execute the avoidance operation and time required for the second liquid delivery pump to proceed to the primary discharge process are calculated by using a position of a plunger of the secondary plunger pump of the first liquid delivery pump and a position of a plunger of the secondary plunger pump of the second liquid delivery pump;
the operation controller is configured to predict, from a result of the prediction calculation, whether or not an execution time zone of the primary discharge process of the first liquid delivery pump and an execution time zone of the primary discharge process of the second liquid delivery pump overlap if the first liquid delivery pump does not execute the avoidance operation; and
the operation controller is configured to cause the first liquid delivery pump to continue the standby process when a result of the prediction is that the execution time zone of the primary discharge process of the first liquid delivery pump and the execution time zone of the primary discharge process of the second liquid delivery pump do not overlap each other, and to cause the first liquid delivery pump to execute the avoidance operation when the result of the prediction is that the execution time zone of the primary discharge process of the first liquid delivery pump and the execution time zone of the primary discharge process of the second liquid delivery pump overlap each other.

10. The binary pump according to claim 6, wherein maximum time of the standby process of the first liquid delivery pump is longer than twice time required for the primary discharge process of the second liquid delivery pump.

11. A liquid chromatograph comprising:
a separation column for separating a sample into individual components;
an analysis channel leading to the separation column;
the binary pump according to claim 1 for delivering a mobile phase in the analysis channel;
a sample injector that injects a sample into a mobile phase flowing through the analysis channel upstream of the separation column; and
a detector that is fluidly connected downstream of the separation column and detects the components separated in the separation column.

* * * * *